(12) United States Patent
Spirer

(10) Patent No.: US 10,317,303 B2
(45) Date of Patent: Jun. 11, 2019

(54) TENSION AND TORQUE CALIBRATION APPARATUS

(71) Applicant: Steven Spirer, Woodcliff Lake, NJ (US)

(72) Inventor: Steven Spirer, Woodcliff Lake, NJ (US)

(\*) Notice: Subject to any disclaimer, the term of this patent is extended or adjusted under 35 U.S.C. 154(b) by 232 days.

(21) Appl. No.: 15/345,797

(22) Filed: Nov. 8, 2016

(65) Prior Publication Data

US 2017/0131171 A1 May 11, 2017

Related U.S. Application Data

(60) Provisional application No. 62/253,380, filed on Nov. 10, 2015.

(51) Int. Cl.
*G01L 25/00* (2006.01)
*G01L 5/24* (2006.01)

(52) U.S. Cl.
CPC ............ *G01L 25/003* (2013.01); *G01L 5/243* (2013.01)

(58) Field of Classification Search
None
See application file for complete search history.

(56) References Cited

U.S. PATENT DOCUMENTS

| 3,354,705 | A | \* | 11/1967 | Dyer, Jr. | G01L 5/0042 73/761 |
| 5,172,774 | A | \* | 12/1992 | Melrose | B25B 23/14 173/182 |
| 5,339,696 | A | \* | 8/1994 | Carignan | G01L 1/2206 73/761 |
| 7,428,845 | B1 | \* | 9/2008 | Collins | G01L 5/243 73/825 |
| 2014/0331829 | A1 | \* | 11/2014 | King | B25B 23/1422 81/467 |

FOREIGN PATENT DOCUMENTS

DE 3408310 A1 \* 10/1984 ............... G01L 5/24

\* cited by examiner

*Primary Examiner* — Jennifer E Simmons
*Assistant Examiner* — Ruben C Parco, Jr.
(74) *Attorney, Agent, or Firm* — Stuart M. Goldstein

(57) ABSTRACT

A unitary tension and torque calibration apparatus consists of a unitary device which has a hollow rotary torque transducer for calibrating the torque of a rotating torque tightening tool. At the same time the torque of the tool is being calibrated, a reaction arm attached to the transducer reacts against rotation to induce stress on the metal component being calibrated. The axial forces generated within the metal component by rotation, opposed by the reaction arm, results in tension which is calibrated by a piston driven load cell secured directly to the transducer. Display devices attached to the transducer and load cell simultaneously and contemporaneously show the calibrated results.

3 Claims, 5 Drawing Sheets

TENSION AND TORQUE CALIBRATION APPARATUS

RELATED APPLICATION

The herein application claims the benefit of provisional application Ser. No. 62/253,380 filed on Nov. 10, 2015.

BACKGROUND OF THE INVENTION

The present invention relates to a calibration apparatus for determining the tension of metal components, for example, bolts, studs, nuts, metal fasteners, and the torque of rotating, fastener tightening tools. More particularly, the present invention discloses a calibration apparatus which simultaneously, contemporaneously, and accurately measures tension and torque for metal components and tools placed under stress.

Industrial strength fasteners, such as metal bolts and their accompanying nuts, undergo significant stress during the bolt/nut installation process. This stress occurs as the nut is turned around the threads of the bolt, causing tension within the bolt, as the bolt stretches and compresses its head against the nut. As it is rotated through the nut, the bolt develops increasing tension as a result of the torque applied by the bolt tightening tool. It is therefore necessary to accurately calibrate the bolt tension and the torque required in order to obtain maximum tightening of the bolt, without breakage, thus ensuring that the proper fastener is being used for a given job.

All prior calibration apparatus and techniques involve calibrating the torque of the tightening tool required to establish the desired tension and then proceeding with a separate operation to calibrate the tension of the fastener/bolt as it relates to the calibrated torque of the tightening tool. This two step process is not only cumbersome and a waste of time, but also results in inaccurate results. There is currently no apparatus which calibrates both metal component tension and the torque required to achieve that tension, simultaneously and contemporaneously. And this apparatus does so easily, quickly, and efficiently.

SUMMARY OF THE INVENTION

It is thus the object of the present invention to overcome the limitations and disadvantages of existing metal component tension and torque calibration devices and techniques, by providing an apparatus which accurately, simultaneously and contemporaneously calibrates the tension of metal components, such as bolts, nuts, studs, and other metal components under stress as it relates to the applied torque needed to achieve that tension.

This objective is accomplished by the present invention, a unitary device which utilizes the principal that for every action there is an equal and opposite reaction. The force transmitted by a tightening tool results in an opposing reaction force which calibrates torque and tension. The device itself comprises a hollow rotary torque transducer for calibrating the torque of a rotating torque tightening tool, i.e. a wrench or similar tool which generates a reaction force. At the same time the torque of the tool is being calibrated, a reaction arm attached to the transducer reacts against rotation to induce stress on the metal component, typically a high strength bolt being calibrated. The axial forces generated within the metal component by rotation, opposed by the reaction arm, results in tension which is calibrated by a piston driven load cell secured directly to the transducer. Display devices attached to the transducer and load cell show the calibrated results.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

The tension and torque calibration apparatus 1 of the present invention is a unitary device which comprises two main components: a torque sensor means in the form of hollow rotary torque transducer 2 secured directly to load cell means in the form of a hydraulically actuated piston driven load cell unit 20.

Figure 4:
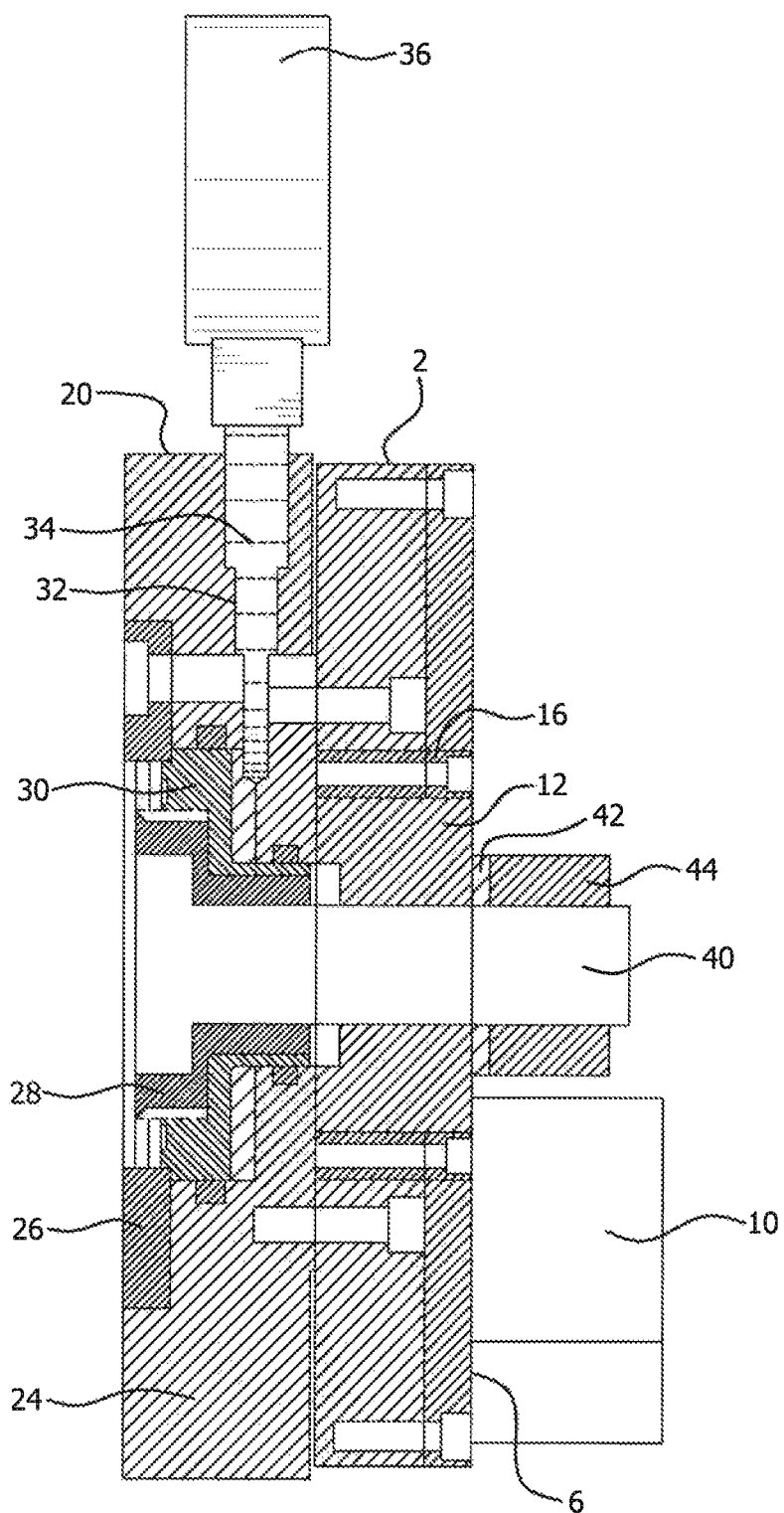
FIG. 4 is a side cross-sectional view of the load cell of the tension and torque calibration apparatus of the present invention.
Figure 5:
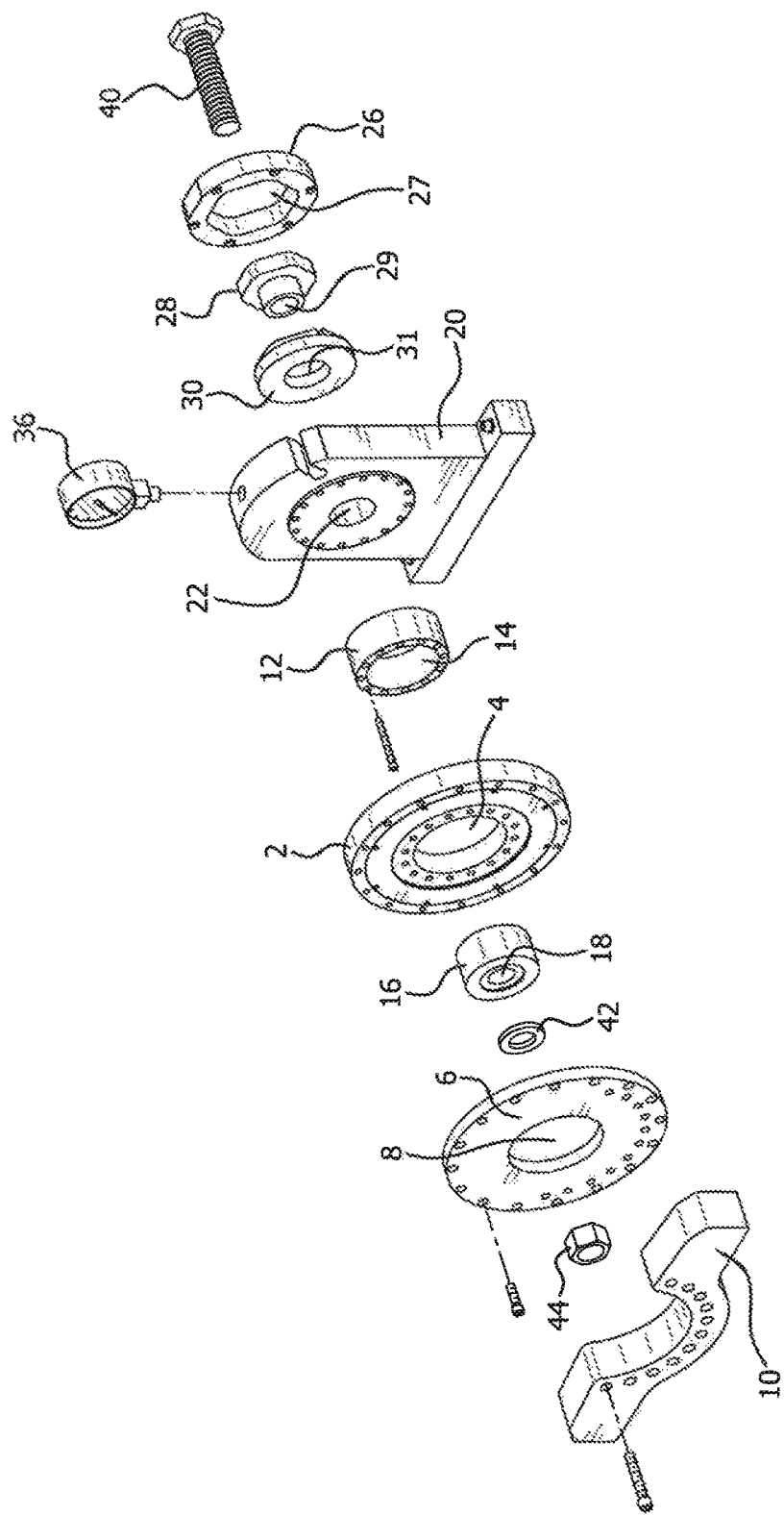
FIG. 5 is an exploded view showing the components of the tension and torque calibration apparatus of the present invention.

Circular transducer 2, a type of strain gauge, is commonly used in the industry to calibrate the torque of al components and tools which are placed under stress. As best seen in FIGS. 4 and 5, transducer 2 has center through opening 4. An adapter plate 6, with center opening 8, is bolted to transducer 2 and reaction arm 10 is bolted onto the surface of the adapter plate and into the transducer. Front plate 12, having center opening 14, is positioned within opening 4 of transducer 2 and opening 8 of adapter plate 6. Front bearing 16, having through opening 18, circumscribes front plate 12. Transducer 2 is bolted to load cell 20.

Load cell 20, having through opening 22, comprises main body 24, rear hex plate 26 having opening 27, rear hex bushing 28 having through opening 29, and piston 30 having opening 31. Passage 32, open to piston 30, contains oil 34, which, when calibration apparatus 1 is operating, flows into and through passage 32 to pressure gauge 36 in order to measure calibrated tension. It is contemplated that gauge 36 is not to be restricted to a pressure gauge. Equivalent measuring gauges, e.g. electric, pneumatic gauges, can be used.

In operation, the metal component to be calibrated, shown in the FIGs. as threaded bolt 40, having washer 42 and threaded nut 44, is positioned and extends through opening 27 of rear hex plate 26, opening 29 of rear hex bushing 28, opening 31 of piston 30, opening 22 of load cell 20, opening 14 of front plate 12, opening 4 of transducer 2, opening 18 of bearing 16, and opening 8 of adapter plate 6. Nut 44 is threaded onto bolt 40 over washer 42. Front plate 12 contacts washer 42 and can be fabricated in different dimensions. Front plate 12 resides inside front bearing 16, which absorbs side loads during operation.

Figure 1:
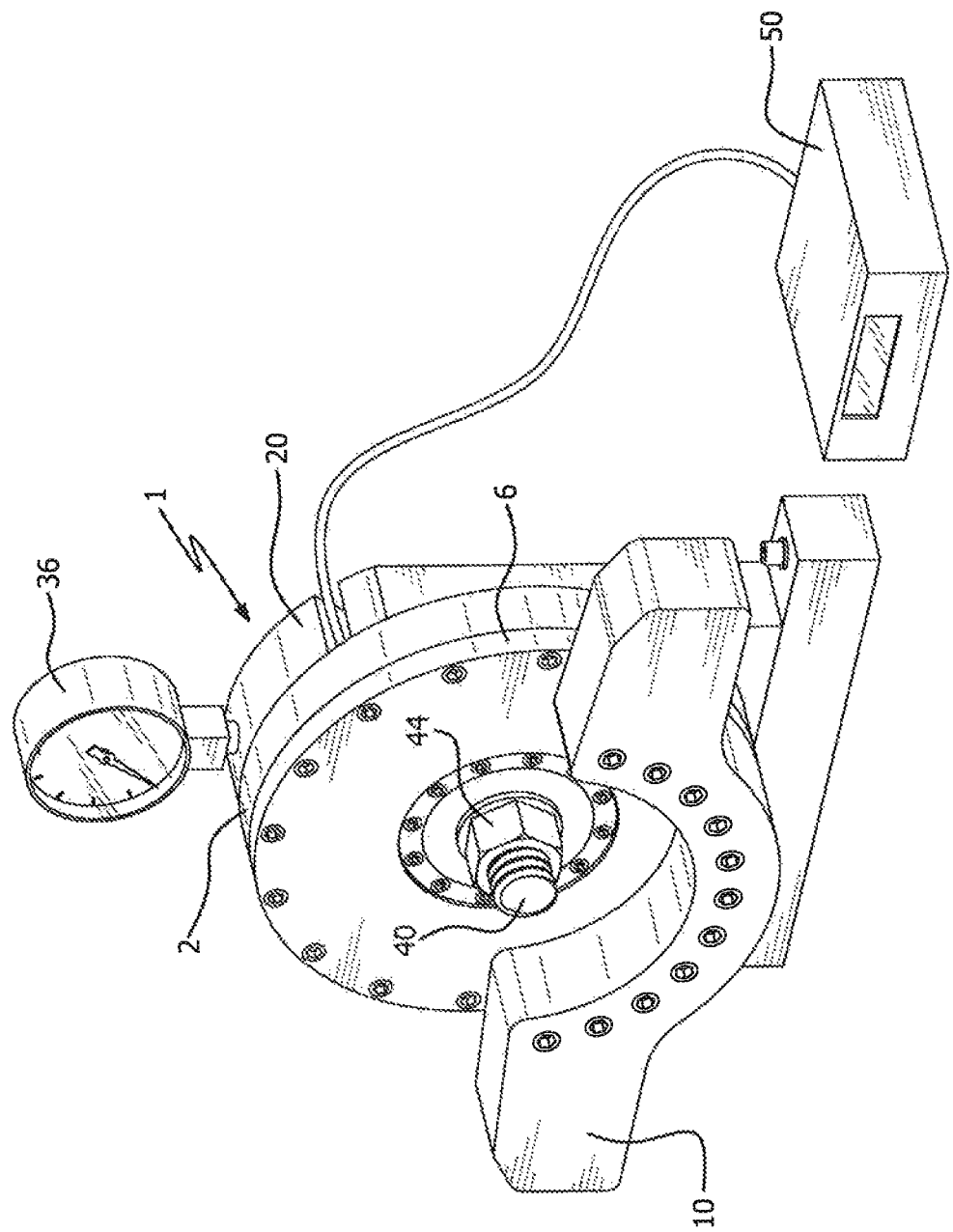
FIG. 1 is an isometric front view of the tension and torque calibration apparatus of the present invention.
Figure 2:
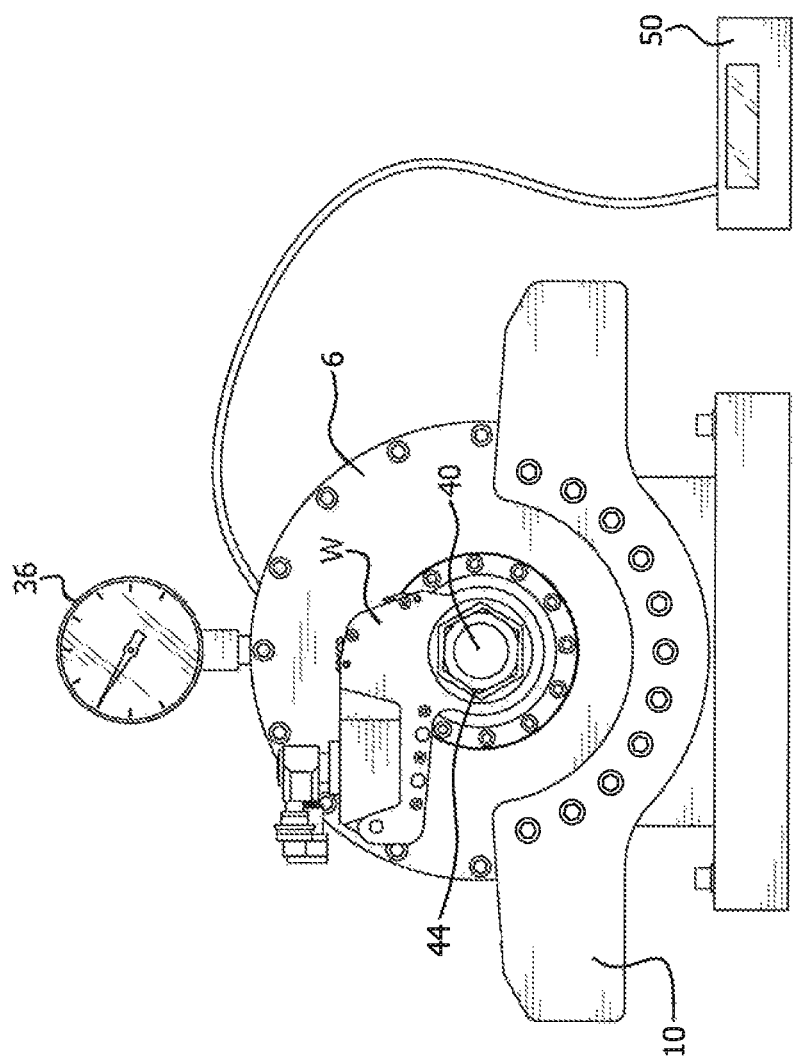
FIG. 2 is a front view of tension and torque calibration apparatus of the present invention, showing the use of an hydraulic wrench during the calibration process.
Figure 3:
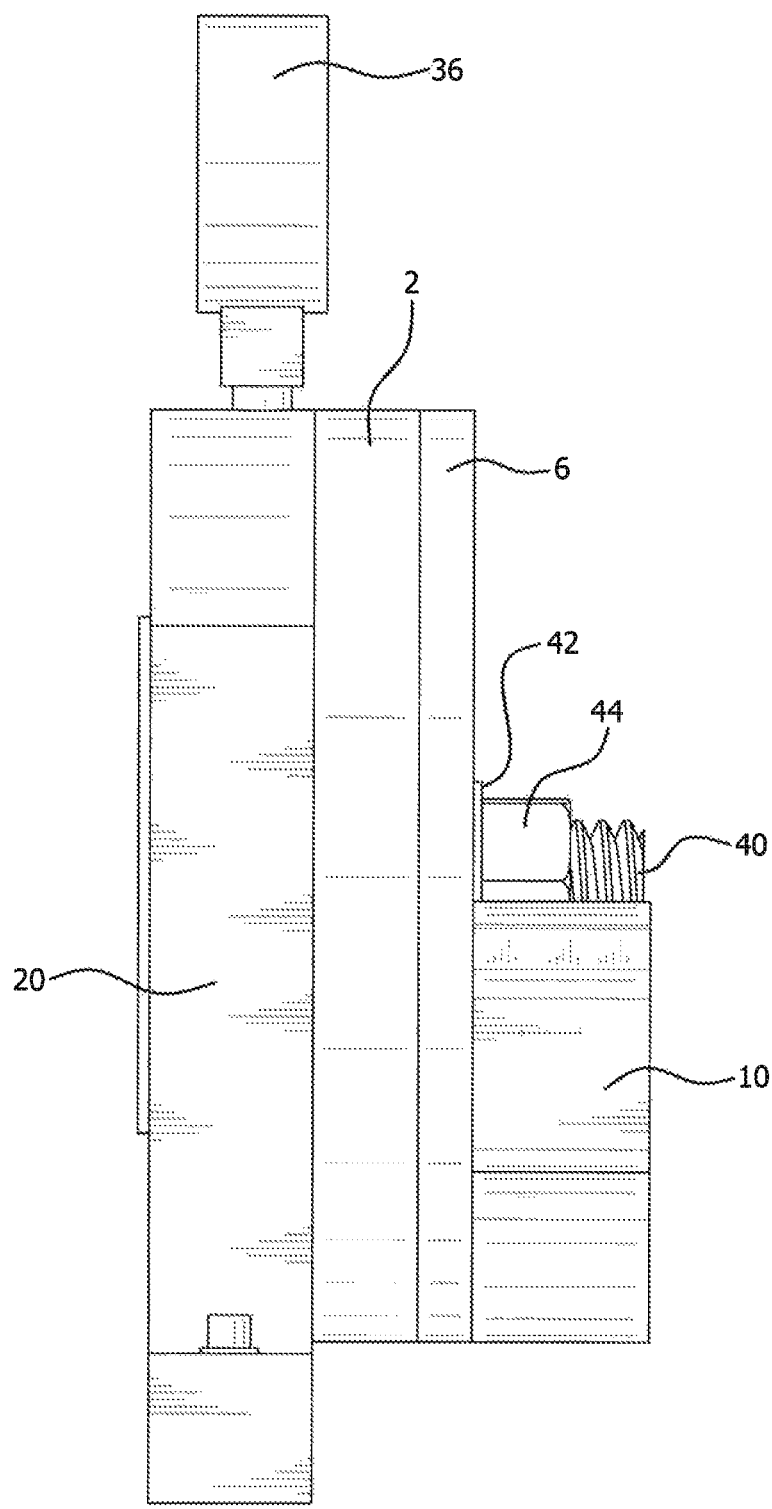
FIG. 3 is a side view of the tension and torque calibration apparatus of the present invention.

Nut 44 is rotated around bolt 40 by any type of commonly used torque tightening tool that generates a reaction force, e.g. pneumatic, electric, or manual multiplier, or hydraulic wrench W, shown in FIG. 2. As wrench W rotates nut 44, the nut reacts against reaction arm 10, thus creating a rotative force opposite to that of the reaction arm. The tension on bolt 40 is achieved by continue tightening of nut 44 by wrench W, which results in increasing axial forces generated within the bolt. As a consequence of these forces, the head of bolt 40 moves axially, causing piston 30 in load cell 20 to move axially against the tensile forces. This causes oil within space 32 to be squeezed into gauge 36, where tension readings can be observed.

As bolt tension is being calibrated, the torque of wrench W is being calibrated, simultaneously and contemporaneously, as wrench W provides a rotative force to nut 44 as it is turned about bolt 40. The real time reactive torque generated by wrench W is measured via transducer 2 and is quantified and shown on electronic or equivalent read-out display 50. The results of the readings can be transmitted to a computer or other data receiver.

This single operation measures the tool torque required to achieve desired bolt tension. In other words, calibration apparatus 1 determines the amount of torque generated by the tightening tool to achieve the desired bolt tension simultaneously and contemporaneously.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. An apparatus for simultaneously and contemporaneously calibrating the tension of a metal component having a nut member at the end of the component, and the torque generated by a tightening tool required to achieve that tension, said apparatus comprising:
   a unitary device comprising:
   a load cell which establishes metal component tension pressure, said load cell having exterior and interior surfaces and a center through opening;
   a hollow circular torque transducer unit having exterior and interior surfaces and a center through opening, said transducer unit being secured directly to the interior surface of the load cell;
   an adapter plate having a center through opening, said adapter plate being secured to the exterior surface of the transducer unit, the center through openings of the load cell, transducer unit, and adapter plate being aligned to form a passage through the apparatus in which the metal component is positioned, the end of the metal component extending outside the unitary device and the nut member at the end of the metal component located flush against the exterior surface of the transducer unit, configured to tighten around the metal component;
   a reaction arm bolted to the adapter plate and to the transducer unit;
   a read-out display for showing the calibrated torque of the tightening tool and a gauge for showing the calibrated tension of the metal component placed under stress, whereby when the metal component is placed under stress by rotation of the nut member against the exterior surface of the transducer unit by the tightening tool, a rotative force is created opposite to that of the reaction arm, tensile forces are created within the metal component, the transducer unit calibrates the real time reactive torque of the tightening tool, and contemporaneously and simultaneously with said calibration of the torque of the tightening tool, the load cell moves axially according to the tensile forces to calibrate the tension of the metal component, the calibrated torque being shown on the read-out display and the calibrated tension being shown simultaneously and contemporaneously on the gauge.

2. The apparatus as in claim 1 wherein the read-out display comprises an electronic read-out display.

3. The apparatus as in claim 1 wherein the load cell comprises an hydraulically responsive piston which moves axially, establishing metal component tension pressure.

* * * * *